INVENTOR:
RALPH E. COUSINO.
BY Owen & Owen
ATT'YS.

INVENTOR:
RALPH E. COUSINO.
BY Owen & Owen
ATT'YS.

United States Patent Office 3,420,463

Patented Jan. 7, 1969

3,420,463

TAPE CARTRIDGE

Ralph E. Cousino, Toledo, Ohio, assignor to Orrtronics, Inc., Perrysburg, Ohio, a corporation of Alabama Filed Jan. 9, 1967, Ser. No. 608,151
U.S. Cl. 242—55.19 11 Claims
Int. Cl. G11b 23/04

ABSTRACT OF THE DISCLOSURE

An endless magnetic tape cartridge playable in all positions includes a tape spool having its upper plate removably locked to its hub. A pressure roller assembly mounted within the cartridge includes a hub having a plurality of spaced openings and a resilient roller covering mounted on the hub and seated within the hub openings. A stripper bar is mounted within the cartridge in opposed relationship to a non-conforming tape entranceway. A label is mounted over assembly screws connecting a cover and base comprising the housing, thereby providing a cartridge tamper indicator.

*Background of the invention*

The present invention relates to a tape cartridge, and, more particularly to a removable endless magnetic tape cartridge for use in a sound tape recording and/or reproducing device. Removable endless tape cartridges, similar to those disclosed in the present application, have many advantages over conventional reel to reel tapes. The endless tape cartridges are self threading and may be easily changed. They also have the advantage that the magnetic tape is stored within the cartridge and is completely protected from damage when the cartridges are stored apart from the reproducing apparatus.

Prior art endless tape cartridges have several disadvantages which the present invention solves. Prior art cartridges are suitable for playing only in a single horizontal position. Endless tape cartridges, constructed according to the present invention, may be played in a horizontal position, a vertical position or an up-side down horizontal position. While transport apparatus which is designed for automotive use is commonly designed for a cartridge which plays only in a horizontal position, it is desirable to provide recording and reproducing devices for other applications such as home usage in which the cartridge is operable in a vertical position.

Another disadvantage of prior art endless tape cartridges is that the pinch or pressure roller had a tendency to slip thereby causing flutter and wow.

A further problem occurring in prior art tape cartridges is that in all tape cartridges of this general type, the tape is pushed into the cartridge during the initial start up period. After the tape disc upon which the coil of magnetic tape is resting has begun to rotate at operating speeds, the peripheral speed of the outer layers of magnetic tape is faster than the discharge speed of the inner layers, due to the difference in radii. Therefore, at normal operating speeds the tape is pulled into the cartridge rather than being pushed as mentioned above. However, during the initial start up, when the tape is being pushed, many of the prior art endless tape cartridges are subject to the buildup of tape between the drive capstan of the reproducing device and the entrance throat of the tape cartridges. This is commonly referred to as the "accordion pleat" problem and results in many tape cartridge malfunctions.

It is the primary object of the present invention to provide an improved endless tape cartridge which may be played in either a horizontal, a vertical, or an up-side down position.

It is still another object of the present invention to provide an endless tape cartridge having as an element an improved pressure roller assembly.

It is a further object of the present invention to provide an endless tape cartridge having a tamperproof feature.

Other objects and advantages of the invention will be apparent from the following detailed description of a preferred embodiment thereof, reference being made to the accompanying drawings, in which.

*Detailed description*

Figure 1:
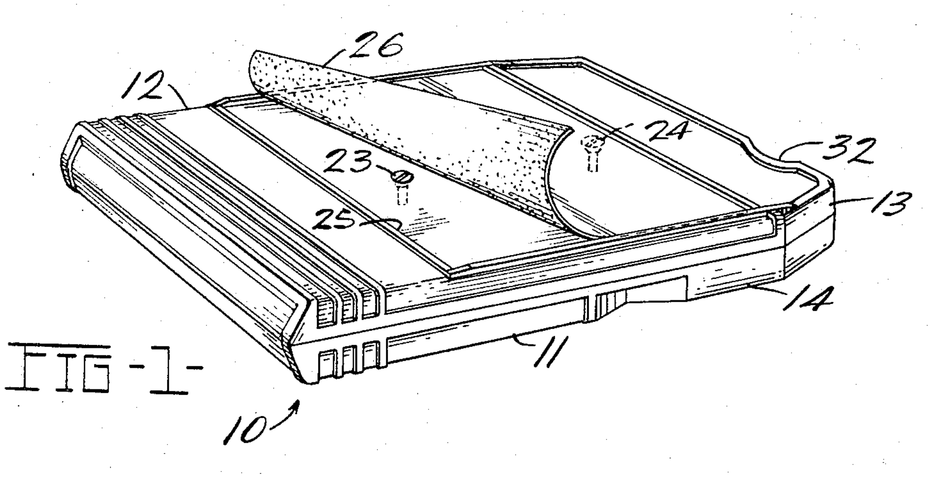
FIG. 1 is a view in perspective of a removable cartridge for endless tape, according to the present invention, and showing in particular the tamperproof feature.
Figure 2:
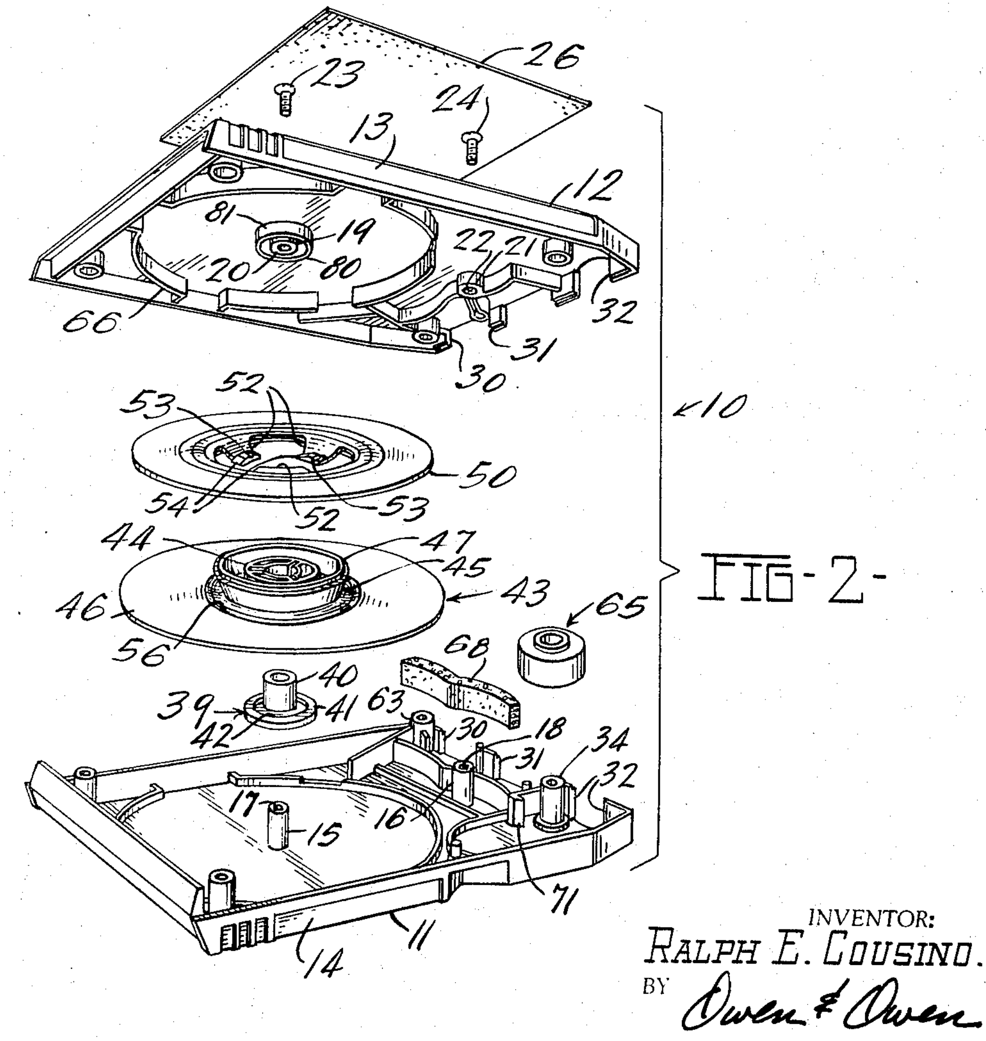
FIG. 2 is an exploded view in perspective of the endless tape cartridge of FIG. 1, showing the internal parts as they would be assembled but not showing a coil of magnetic tape within the cartridge.

Referring to FIGURES 1 and 2, a tape cartridge according to the present invention is generally indicated by the reference number 10. The tape cartridge 10 includes a housing consisting of a base 11 and an outer cover 12. As may be observed in FIGURE 1, the outer cover 12 has a downwardly extending sidewall 13 which is complementary with an upwardly extending sidewall 14 of the base 11. When the outer cover 13 is secured to the base 11, as shown in FIGURE 1, the components form a complete enclosure or housing for the reception of a coil of endless magnetic tape as will be described below.

The base 11 is provided with a center post 15 and a front post 16. The center post 15 has a threaded opening 17 provided in its upper surface and, similarly, the front post 16 has a threaded opening 18. The outer cover 12 has a downwardly extending center projection 19 having a central bore 20 extending therethrough and a front projection 21 having a central bore 22.

The central post 15 and the front post 16 on the base 11 index with the central projection 19 and front projection 21 of the outer cover 12. When the base 11 and outer cover 12 are in the assembled position, shown in FIGURE 1, assembly screws 23 and 24 are positioned within the central bores 20 and 22 and are engaged in the threaded openings 17 and 18 of the posts 15 and 16.

The upper surface of the outer cover 12 has a rectangular label recess 25 and the assembly screws 23 and 24 are located within the boundaries of the label recess 25. After the assembly screws 23 and 24 are inserted, a label 26 is positioned within the label recess 25 in overlying relationship with respect to the screws 23 and 24. If a person wishes to disassemble the tape cartridge 10, it is necessary to destroy the label 26 before the assembly screws 23 and 24 may be removed. The tape cartridge 10 thus includes a tamperproof feature and still retains the capability of being disassembled if necessary.

Figure 3:
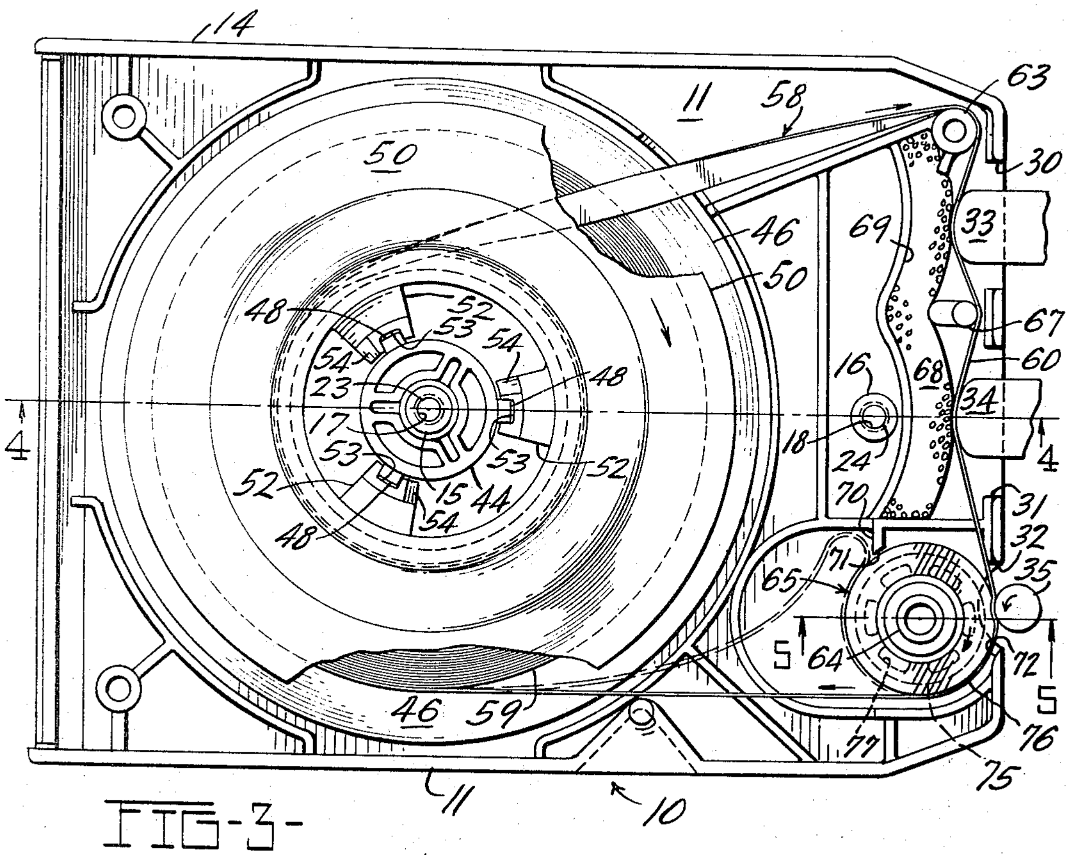
FIG. 3 is an enlarged plan view of the tape cartridge shown in FIG. 1 with the outer cover removed and showing a pair of tracking heads and a drive capstan of a commonly used recording and/or reproducing device.
Figures 4, 5, 6:
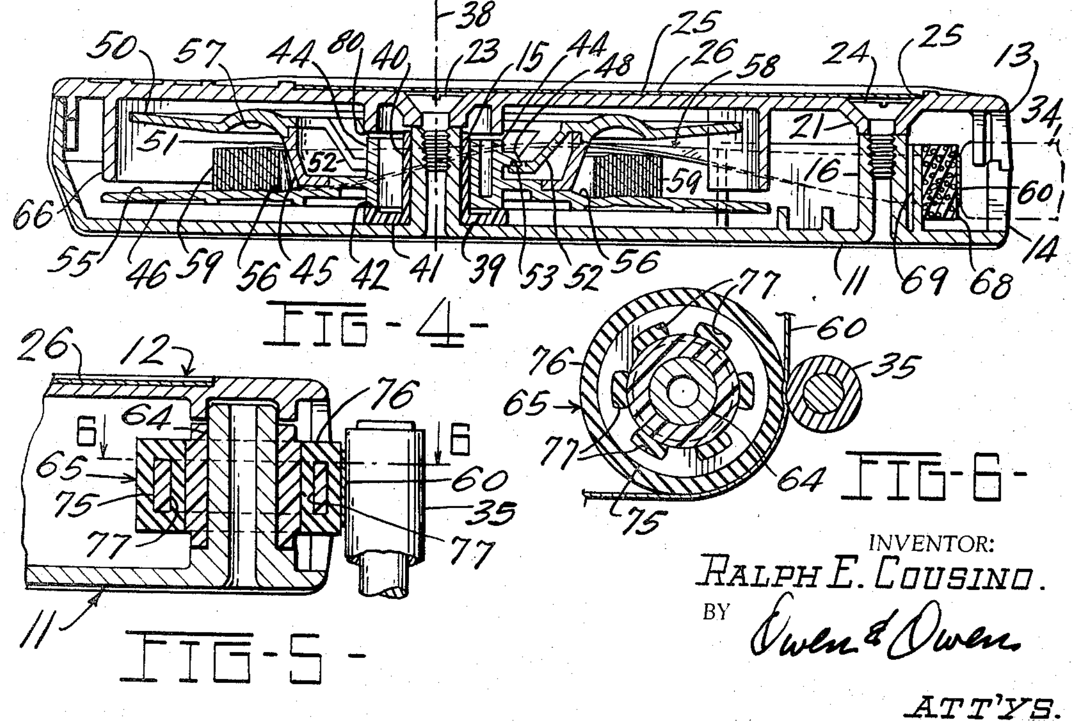
FIG. 4 is a cross-sectional view taken along the line 4—4 of FIG. 3.
FIG. 5 is an enlarged cross-sectional view taken along the line 5—5 of FIG. 3 and showing in detail the pressure roller assembly.
FIG. 6 is a cross-sectional view taken along the line 6—6 of FIG. 5.

Referring to FIGURE 3, the tape cartridge 10 includes spaced head openings 30 and 31 located along its front edge. The tape cartridge 10 is also provided with a drive recess or opening 32 in its front portion. When the tape cartridge 10 is moved ito playing position, as shown in FIGURES 3 and 4, the openings 30 and 31 receive heads 33 and 34 of a sound reproducing apparatus and the recess 32 receives a drive capstan 35. For the purposes of this disclosure, only the heads 33 and 34, and the drive capstan 35 of the reproducing apparatus have been illustrated in the drawings. Recording and/or reproducing apparatus suitable for use with the tape cartridge 10 are well known in the art and are not the subject of the present invention.

Referring to FIGURES 2 and 4, in the present embodiment, the center post 15 is normal to the base 11 and defines an axis of rotation generally indicated by the reference number 38 in FIGURE 4. A floating bearing 39 having a cylindrical portion 40 and a base portion 41 of an increased diameter is placed upon the center post 15. The upper surface of the base portion 41 defines a continuous circular bearing surface 42.

A tape disc assembly 43 is journaled upon the cylindrical portion 40 of the floating bearing 39. The assembly 43 includes a central portion 44, a frusto-conical hub 45 and a tape disc 46. The upper portion of the frusto-conical hub 45 is provided with a circular shoulder 47.

The circular central portion 44 of the assembly 43 has three circumferentially spaced and outwardly extending locking lugs 48. A cover disc 50 is removably locked to the tape disc assembly 43 as shown in FIGURES 3 and 4. The cover disc 50 has an inner circular lip 51 which abuts the circular shoulder 47 of the tape disc assembly 43. The cover disc 50 also includes, in the present embodiment, three inwardly directed semi-flexible fingers 52. Referring to FIGURE 3, each of the fingers 52 has a lug recess 53 adjacent its end and a ramp 54 adjacent each of the recesses 53. During assembly, the fingers 52 are positioned adjacent the locking lugs 48. The disc 50 is then rotated and the locking lugs 48 engage the ramps 54. As the cover disc 50 continues to rotate, the locking lugs 48 continue to move up the ramps 54 and the force depresses the outermost ends of the semi-flexible fingers 52. Continued rotation snaps the lug recesses 53 into indexing relationship with the locking lugs 48 and the fingers 52 are biased into locking relationship with the tape disc assembly 43.

As shown in FIGURE 4, the bottom surface of the cover disc 50, the outermost surface of the frusto-conical hub 45, and the upper surface of the tape disc 46 form a generally U-shaped tape storage area 55. Because of the positive lock between the tape disc assembly 43 and the cover disc 50, and because of the engaging relationship of the circular shoulder 47, and the circular lip 51 of the cover disc 50, there are no openings adjacent the frusto-conical hub 45 through which one or more strands of magnetic tape can pass which would cause a malfunction of the tape cartridge 10. This is an important feature of the present structure.

The tape disc 46 is provided with an annular, tapered recess 56 adjacent the frusto-conical hub 45. Similarly, the cover disc 50 is provided with an annular tapered recess 57 adjacent the frusto-conical hub 45. An endless tape 58 is positioned within the tape cartridge 10. The endless tape 58 includes an annular tape coil 59 and a tape loop 60 which extends between the innermost convolution of the tape coil 59 and the outermost convolution of the tape coil 59. The tape coil 59 is supported upon the tape disc 46 when the tape cartridge 10 is in the playing position shown in FIGURE 3. When the tape cartridge 10 is played in an up-side down position (not shown) the tape coil 59 is supported upon the cover disc 50.

The theory of operation of endless tapes is well known in the prior art and it is sufficient to point out that when the endless tape 58 is withdrawn from the innermost convolution of the tape coil 59, the tape coil 59 and the tape disc 46 are moved in the directions shown by the arrows in FIGURE 3. The tape loop 60 moves across the heads 33 and 34 of the reproducing apparatus and is returned to the outermost convolution of the tape coil 59. The difference between the unwinding rate and the winding rate caused by the difference in circumference of the innermost and outermost tape convolutions is compensated for by the sliding of individual tape convolutions relative to each other upon the tape disc 46.

Referring to FIGURE 3, a guide post 63 is provided adjacent the front corner of the tape cartridge 10. The guide post 63 is parallel to the axis of rotation 38 and the tape loop 60 is guided around the post 63 as the magnetic tape is withdrawn from the innermost convolution of the tape coil 59. A pressure roller post 64 is provided on the opposite side of the tape cartridge 10. A pressure roller assembly, generally indicated by the reference number 65 and described in detail below, is mounted for rotation on the post 64. The tape loop 60 is guided around the pressure roller assembly 65 and is directed rearwardly to the outermost convolution of the tape coil 59. Referring to FIGURE 4, the tape cartridge 10 is preferably provided with a depending skirt 66 which overlies the outermost edge of the tape disc 46 to contain the tape coil 59.

Referring to FIGURE 3, a center guide post 67 is positioned between the head openings 30 and 31 in the front of the tape cartridge 10. After the tape loop 60 leaves the guide post 63, the tape is guided across the center guide post 67 and then to the pressure roller assembly 65. A resilient pressure pad 68, supported by a pad wall 69, extends across the front of the tape cartridge 10 in the area between the guide post 63 and the pressure roller assembly 65. The resilient pressure pad 68 urges the tape loop 60 against the heads 33 and 34 of the reproducing apparatus. (See FIGURE 4.) In the present embodiment, a stripper bar 70 is mounted adjacent the outer periphery of the pressure roller assembly 65. The stripper bar 70 has a surface 71 which generally conforms with the surface configuration of the pressure roller assembly 65. As the tape loop 60 travels around the pressure roller assembly 65, there is a tendency for the tape to stick and travel with the pressure roller, forming an undesirable loop as indicated by the dashed lines in FIGURE 3. The stripper bar 70 removes the loop from the periphery of the pressure roller assembly 65 and prevents a malfunction of the tape cartridge 10. It has been found that placing the stripper bar 70 in an opposed relationship to a tape entrance throat 72, which is defined between the pressure roller assembly 65 and a front wall segment of the tape cartridge 10, is preferable to the placing of a stripper bar adjacent the throat 72. If the stripper bar is placed adjacent the tape entrance throat, an undesired loop tends to form exteriorly of the tape cartridge resulting in a much greater likelihood of malfunction.

When the tape cartridge 10 is initially placed into playing position in a reproducing apparatus, as shown in FIGURE 3, the tape loop 60 is pinched between the pressure roller assembly 65 and the drive capstan 35. The drive capstan 35 begins to rotate and, during this initial period, the tape loop 60, after it leaves the nip between the drive capstan 35 and the pressure roller assembly 65, is pushed into the tape cartridge 10 and becomes the outermost convolution of the tape coil 59. In many prior art tape cartridges, this pushing results in an accordion pleat which is formed exteriorly of the tape cartridge 10 adjacent the nip. Often this accordion pleat results in an immediate malfunction of the prior art tape cartridge. It has been found that by placing the stripper bar 70 in the opposed relationship with respect to the tape entrance throat 72 and by enlarging the tape entrance throat 72 to at least .050 inch, the accordion pleat problem is substantially eliminated. After the tape disc 46 begins to operate at its normal operational speed, the outermost convolution of the tape coil 59 is moving at a greater speed than the innermost convolution and the portion of tape between the nip and the outermost convolution of the tape coil 59 is under tension.

An important feature of the present structure is the construction of the pressure roller assembly 65. The assembly 65 comprises a central pressure roller hub 75 and an outer resilient cover 76. Referring to FIGURES 5 and 6, the hub 75 has a plurality of openings 77 which are circumferentially spaced and extend through the hub 75 parallel to its axis of rotation. The hub 75 also has a central bore 78 which receives the pressure roller post 64 when the tape cartridge 10 is in the assembled position. The resilient cover 76 is molded directly upon the hub 75 and the resilient cover material completely fills the hub openings 77, thereby forming an essentially integral assembly. One of the problems with prior art pinch roller constructions was that the outer resilient layer had a tendency to move relative to the inner hub which created a flutter and wow problem.

Referring to FIGURE 4, when the tape cartridge 10 is in the normal playing position, the tape disc assembly 43 and the locked-in-place cover disc 50 ride upon the continuous bearing surface 42 of the floating bearing 39. However, when the tape cartridge 10 is played in the up-side down position the tape disc assembly 45 and the locked cover disc 50 ride upon a continuous annular bearing surface 80 of an integral ring bearing 81 which depends from the outer cover 12.

When the tape cartridge 10 is in the playing position shown in FIGURE 3, the tape loop 60 is withdrawn from the inner-most convolution of the tape coil 59 whereby the tape is essentially parallel with respect to the upper surface of the coil 59. The tape is rotated approximately 90 degrees as it passes the guide post 63. The guide post 63, the center guide post 67, and the pressure roller assembly 65 serve to guide the tape loop 60 in a path across the heads 33 and 34 of the reproducing apparatus. After the tape loop 60 moves past the nip between the pressure roller assembly 65 and the drive capstan 35, it remains in a position parallel to the axis of rotation 38 and is directed back to the outermost convolution of the tape coil 59.

While the present invention has been disclosed in connection with a specific arrangement of parts and with respect to a perferred embodiment, it should be expressly understood that numerous modifications and changes may be made without departing from the scope of the invention.

What I claim is:

1. A tape cartridge for an endless sound reproducing tape comprising, in combination, a base, a tape disc assembly mounted on said base for rotation about an axis normal to said base, a cover disc removably locked to said tape disc assembly, said cover disc and said tape disc assembly defining a generally U-shaped tape storage area for receiving a coil of sound reproducing tape, a tape guide positioned adjacent a front edge of said cartridge for guiding a loop of such tape from between said tape disc assembly and said cover disc and across the front of said cartridge with a major surface of such tape disposed in parallel relationship with such axis of rotation, at least one head opening defined in the front of said cartridge effective to receive a head of a reproducing apparatus, a pressure roller assembly mounted adjacent the front of said cartridge in opposed relationship to said tape guide, and an outer cover removably secured to said base.

2. A tape cartridge according to claim 1, wherein the pressure roller assembly comprises a hub member having a longitudinally extending central bore, said hub member defining a plurality of longitudinally extending openings which are parallel to such central bore, such openings being circumferentially spaced from one another, and an outer resilient cover adjacent said hub member, said outer cover having integral portions disposed within such hub member openings, whereby relative movement between said hub member and said outer cover is substantially eliminated.

3. A tape cartridge according to claim 1, including locking means for removably connecting said cover disc and said tape disc assembly, said locking means comprising a plurality of outwardly directed lugs circumferentially spaced on said tape disc assembly, and a plurality of semi-flexible fingers on said cover disc adjacent said locking lugs, each of said fingers defining a recess for the reception of one of said lugs.

4. A tape cartridge according to claim 1, including tamper indicating means for detecting disassembly of said base, and said outer cover, said tamper indicating means comprising a label recess defined in the outside surface of said outer cover, means for connecting said base to said outer cover, said connecting means having outer ends disposed within such label recess, and a label adhesively secured within such label recess in overlying relationship with respect to said outer ends, whereby said label must be damaged to remove said connecting means.

5. A tape cartridge according to claim 1, including a center post extending normal to said base, said center post defining the axis of rotation of said tape disc assembly, a bearing member mounted on said center post, said tape disc assembly journaled for rotation upon said bearing member, said bearing member defining a first continuous, annular, bearing surface, said tape disc assembly defining a second continuous, annular, bearing surface complementary with such first bearing surface, whereby said first and second bearing surfaces are in engaging relationship during rotation of said tape disc assembly when said tape cartridge is in a normal playing position.

6. A tape cartridge according to claim 5, including an annular bearing mounted on said outer cover in concentric relationship with such axis of rotation of said tape disc assembly, said annular bearing defining a third continuous bearing surface, said tape disc assembly defining a fourth continuous annular bearing surface complementary with such third bearing surface, whereby said third and fourth bearing surfaces are in engaging relationship during rotation of said tape disc assembly when said tape cartridge is in an up-side down playing position.

7. A tape cartridge according to claim 5, including tape pressure means laterally disposed in the front of said tape cartridge for resiliently urging a portion of tape firmly against at least one head of a reproducing apparatus.

8. A tape cartridge according to claim 7, wherein the pressure roller assembly comprises a hub member having a central bore, said hub member defining a plurality of circumferentially spaced material openings, and an outer resilient cover member adjacent said hub member, said cover member having integral portions disposed within such material openings, whereby relative movement between said hub member and said cover member is substantially eliminated.

9. A tape cartridge according to claim 8, including tamper indicating means for detecting disassembly of said base and said outer cover, said tamper indicating means comprising a recess defined in the outer surface of said outer cover, means for connecting said base to said outer cover, said connecting means having outer ends disposed within such recess, and a thin strip adhesively secured within such recess in overlying relationship with respect to said outer ends, whereby said strip must be damaged to remove said connecting means.

10. A tape cartridge according to claim 9, wherein a tape entrance throat is defined between a front wall portion of said cartridge and said pressure roller assembly, including a stripper bar positioned within said tape cartridge adjacent the outer periphery of said pressure roller assembly, said stripper bar being positioned in opposed relationship to said tape entrance throat.

11. A tape cartridge according to claim 10, wherein said tape entrance throat is at least .050 inch wide.

References Cited

UNITED STATES PATENTS 3,322,360 5/1967 Roys.
3,252,670 5/1966 Smith.

LEONARD FORMAN, *Primary Examiner.*

R. A. FIELDS, *Assistant Examiner.*

U.S. Cl. X.R.

179—100.2; 226—181, 190; 274—4